(12) United States Patent
Nakata et al.

(10) Patent No.: US 9,691,426 B2
(45) Date of Patent: Jun. 27, 2017

(54) OPTICAL DEVICE AND OPTICAL DISC RECORDING OR REPRODUCING METHOD FOR OPTICAL DISC INCLUDING BCA HAVING ZONE FORMAT IDENTIFIER

(71) Applicant: Panasonic Intellectual Property Management Co., Ltd., Osaka (JP)

(72) Inventors: Kohei Nakata, Nara (JP); Harumitsu Miyashita, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/991,239

(22) Filed: Jan. 8, 2016

(65) Prior Publication Data

US 2016/0217819 A1 Jul. 28, 2016

(30) Foreign Application Priority Data

Jan. 28, 2015 (JP) .................................. 2015-013839
Dec. 14, 2015 (JP) .................................. 2015-242810

(51) Int. Cl.
*G11B 7/24* (2013.01)
*G11B 7/007* (2006.01)
(Continued)

(52) U.S. Cl.
CPC ........ *G11B 7/0079* (2013.01); *G11B 7/00736* (2013.01); *G11B 7/00745* (2013.01); *G11B 7/24079* (2013.01); *G11B 7/24085* (2013.01); *G11B 20/1217* (2013.01); *G11B 27/3027* (2013.01); *G11B 2007/0013* (2013.01); *G11B 2007/00754* (2013.01)

(58) Field of Classification Search
None
See application file for complete search history.

(56) References Cited

U.S. PATENT DOCUMENTS

2002/0105867 A1   8/2002  Tamaru et al.
2004/0071060 A1*  4/2004  Suh ..................... G11B 19/28
                                                    369/275.3
(Continued)

FOREIGN PATENT DOCUMENTS

JP   2002-251737 A   9/2002
JP   2006-031907 A   2/2006
(Continued)

*Primary Examiner* — Tan X Dinh
(74) *Attorney, Agent, or Firm* — Renner, Otto, Boisselle & Sklar, LLP (57) ABSTRACT

According to an optical disc, a track, where data is recorded in predetermined block units, is formed by wobbling at a spatial period in accordance with a radial position, and the track is divided into zones in a radial direction. Data is recorded in each of the zones at a predetermined line density based on a ratio n/m of the number of bits of a bit pattern of recording data to one wavelength of wobbling. The optical disc includes a first area having one of the zones, a second area having one of the zones different from the one of the zones in the first area, and a line density of data different from a line density of data in the first area, and a BCA where a zone format identifier specifying a zone table defining a boundary position of each of the zones and the ratio n/m is recorded.

4 Claims, 6 Drawing Sheets (51) Int. Cl.
  G11B 20/12    (2006.01)
  G11B 7/24079  (2013.01)
  G11B 27/30    (2006.01)
  G11B 7/24085  (2013.01)
  G11B 7/00     (2006.01)

(56) References Cited

U.S. PATENT DOCUMENTS

| | | | |
|---|---|---|---|
| 2004/0228242 A1 | 11/2004 | Tamaru et al. | |
| 2005/0232105 A1 | 10/2005 | Konagai et al. | |
| 2007/0212032 A1 | 9/2007 | Hino | |
| 2008/0279085 A1* | 11/2008 | Yashima | G11B 7/00736 369/275.3 |
| 2011/0075540 A1* | 3/2011 | Horibata | G11B 7/00736 369/275.3 |
| 2012/0113793 A1* | 5/2012 | Kobayashi | G11B 7/00736 369/275.3 |
| 2013/0201813 A1* | 8/2013 | Akimoto | G11B 7/00736 369/275.3 |
| 2014/0160908 A1 | 6/2014 | Hino et al. | |

FOREIGN PATENT DOCUMENTS

| | | |
|---|---|---|
| JP | 2007-265551 A | 10/2007 |
| WO | WO 2005/031717 A1 | 4/2005 |
| WO | WO 2013/140756 A1 | 9/2013 |

* cited by examiner

| Zone number | Pwo | Pm | m | n |
|---|---|---|---|---|
| 1 | 0x1A500 | 0x0B5600 | 100 | 90 |
| 2 | 0x1D400 | 0x0DBC00 | 100 | 94 |
| 3 | 0x20000 | 0x100000 | 100 | 100 |
| 4 | 0x22D00 | 0x126D00 | 100 | 106 |
| .. | .. | .. | .. | .. |
| 32 | 0xA1200 | 0xCA4400 | 100 | 200 |

Rows 1–2: Line density equivalent to 50 GB/layer
Rows 3–32: Line density equivalent to 50 GB/layer

FIG. 3B

| Zone number | Pwo | Pm | m | n |
|---|---|---|---|---|
| 1 | 0x1A500 | 0x0B5600 | 100 | 90 |
| 2 | 0x1D400 | 0x0DBC00 | 100 | 94 |
| 3 | 0x20000 | 0x100000 | 100 | 120 |
| 4 | 0x22800 | 0x161000 | 100 | 126 |
| .. | .. | .. | .. | .. |
| 40 | 0xA1300 | 0xF29D00 | 100 | 240 |

Rows 1–2: Line density equivalent to 50 GB/layer
Rows 3–40: Line density equivalent to 60 GB/layer

FIG. 6

OPTICAL DEVICE AND OPTICAL DISC RECORDING OR REPRODUCING METHOD FOR OPTICAL DISC INCLUDING BCA HAVING ZONE FORMAT IDENTIFIER

BACKGROUND OF THE INVENTION

1. Field of the Invention

The present disclosure relates to an optical disc on which data is optically recorded, and an optical disc recording or reproducing method for performing recording or reproducing data on the optical disc.

2. Description of the Related Art

As a technology for increasing the recording density per volume of an optical disc, there is a technology of land-and-groove recording or reproducing which ensures high track recording density. This technology is already used for DVD-RAM. Conventionally data is recorded only on grooves or on lands. And this technology increases the track recording density by recording data on both grooves and lands.

However, DVD-RAM includes a data recording area and an address area in a track, and an area for independently demodulating data has to be provided in the data recording area and the address area, and thus use efficiency of the format is down, and an area for recording data is wastefully used. With respect to this problem, there is disclosed a technology for not wasting the data recording area by recording address information by wobbling of the groove track (see PTL 1).

CITATION LIST

Patent Literature

PTL 1: WO 2013/140756 A

SUMMARY OF THE INVENTION

The present disclosure provides an optical disc and an optical disc recording or reproducing method which allow recording of data at a plurality of line densities.

According to an optical disc of the present disclosure, a track where data is recorded in predetermined block units formed by wobbling at a spatial period in accordance with a radial position, and the track is divided into a plurality of zones in a radial direction. Data is recorded in each of the plurality of zones at a predetermined line density based on a ratio n/m (m and n are natural numbers) of the number of bits of a bit pattern of recording data to one wavelength of the wobbling, and there are included a first area having at least one of the plurality of zones, a second area having at least one of the plurality of zones different from the at least one of the plurality of zones in the first area, and a line density of data different from a line density of data in the first area, and a Burst Cutting Area (BCA), where a zone format identifier specifying, for each of the plurality of zones, a zone table defining a boundary position of each of the plurality of zones and the ratio n/m of the number of bits, is recorded.

Also, an optical disc recording or reproducing method according to the present disclosure is an optical disc recording or reproducing method for recording or reproducing data on the optical disc of the present disclosure, and includes acquiring the zone format identifier in the BCA on the optical disc, determining a recording or reproducing position in the at least one of the plurality of zones including a target position of data, based on the zone table corresponding to the zone format identifier, and recording or reproducing data from the recording or reproducing position.

According to the optical disc and the optical disc recording or reproducing method according to the present disclosure, data can be recorded at a plurality of line densities.

DETAILED DESCRIPTION OF THE PREFERRED EMBODIMENT

Hereinafter, an exemplary embodiment will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the accompanying drawings and the following description are provided for those skilled in the art to fully understand the present disclosure, and the subject described in the claims is not intended to be limited by the appended drawings and the following description.

First Exemplary Embodiment (1-1. Configuration)

Figure 1:
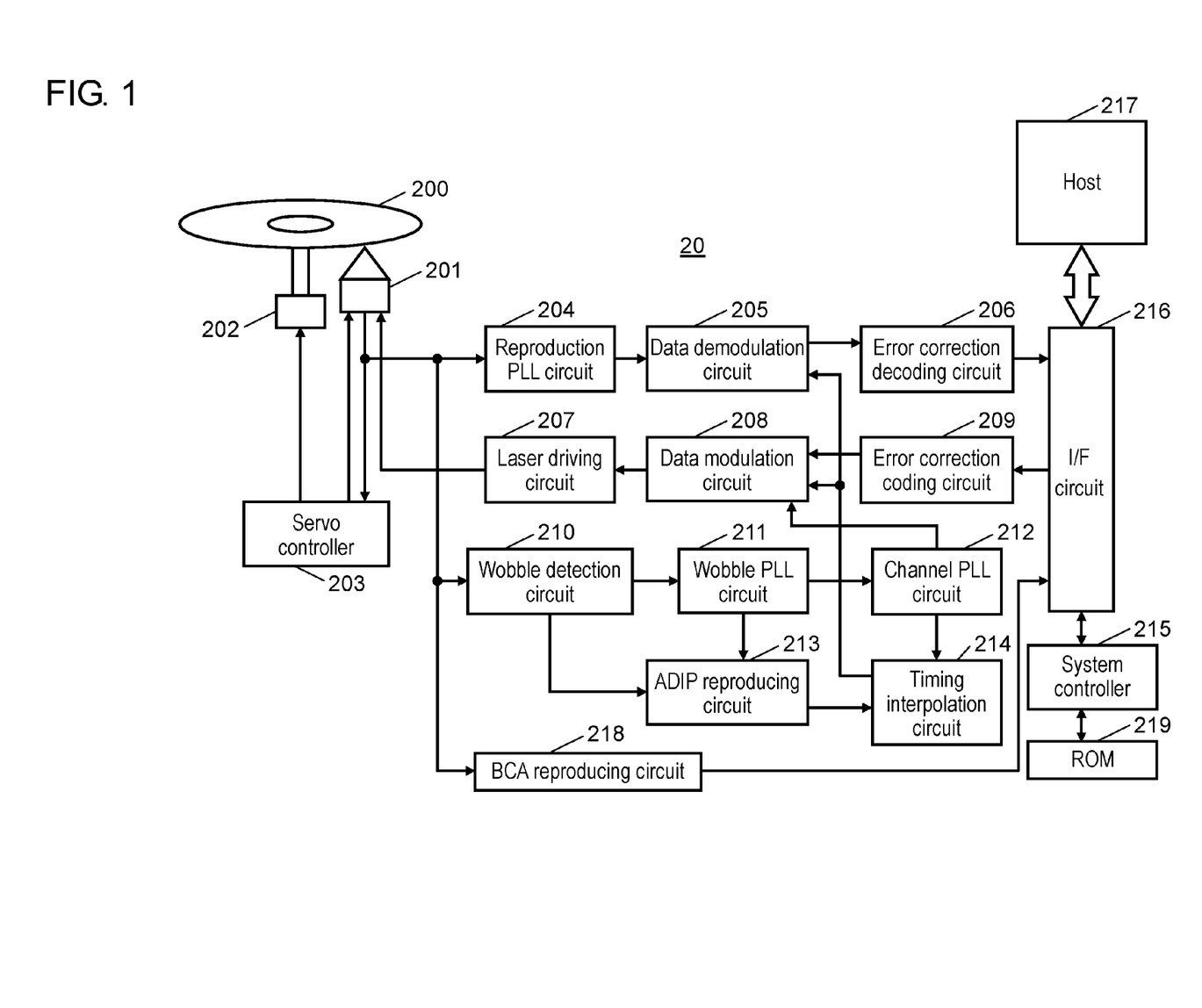
FIG. 1 is a configuration diagram of an optical disc device according to an exemplary embodiment.

FIG. 1 is a configuration diagram of optical disc device 20 according to a present exemplary embodiment. As shown in FIG. 1, optical disc device 20 includes optical head 201, spindle motor 202, servo controller 203, reproduction Phase Locked Loop (PLL) circuit 204, data demodulation circuit 205, error correction decoding circuit 206, laser driving circuit 207, data modulation circuit 208, error correction coding circuit 209, Burst Cutting Area (BCA) reproducing circuit 218, wobble detection circuit 210, wobble PLL circuit 211, channel PLL circuit 212, ADress In Pre-Groove (ADIP) reproducing circuit 213, timing interpolation circuit 214, system controller 215, Interface (I/F) circuit 216, and Read Only Memory (ROM) 219.

Optical disc device 20 performs recording data on optical disc 200 or reproducing data on optical disc 200. A track is spirally formed on optical disc 200, from the inner circumference to the outer circumference. The track is configured by a groove track formed by a groove, and a land track formed between adjacent groove tracks. Data is recorded on both the groove track and the land track.

Figure 2:
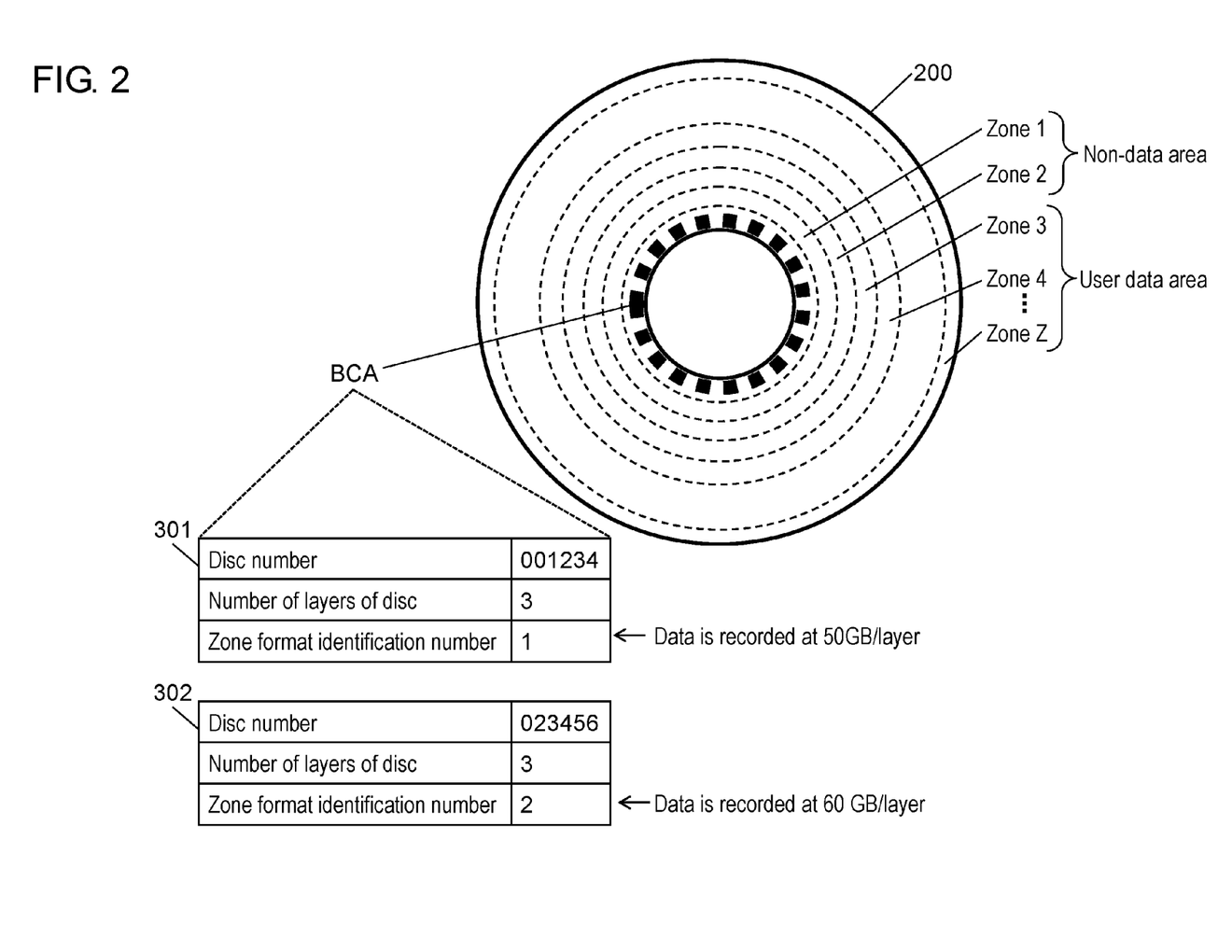
FIG. 2 is a diagram showing zones of an optical disc according to the exemplary embodiment.

Now, optical disc 200 according to the present exemplary embodiment will be described. FIG. 2 is a diagram showing zones of optical disc 200 of the present exemplary embodiment. The recording surface of optical disc 200 includes a BCA and a recordable area in this order from the inner circumference.

Disc management information unique to each disc, such as a disc number, a number of layers of the disc, and a zone format identification number of optical disc 200, is recorded in the BCA. Specifically, "001234" as the disc number, "3" as the number of layers of the disc and "1" as the zone format identification number are respectively recorded in disc management information 301. Also, as another example, "023456" as the disc number, "3" as the number of layers of the disc and "2" as the zone format identification number are respectively recorded in disc management information 302.

Here, the zone format identification number is an identifier indicating a type of format of data recorded on optical disc 200, and for example, a line density for zone format identification number "1" defines the line density of a recording capacity of 50 GB per layer, a line density for zone format identification number "2" defines the density of a recording capacity of 60 GB per layer, and a line density for zone format identification number "3" defines the density of a recording capacity of 80 GB per layer. Accordingly, disc management information 301 indicates an optical disc having a line density of a recording capacity of 50 GB per layer, and disc management information 302 indicates an optical disc having a line density of a recording capacity of 60 GB per layer. The disc management information is recorded several times in the BCA, such as four times.

The recordable area is divided into Z pieces (Z is a natural number of two or more) in the radial direction. Optical disc device 20 sets a frequency of recording clock or a recording velocity (linear velocity) for each of the plurality of zones.

A non-data area and a user data area are included in the recordable area of optical disc 200. For example, as shown in FIG. 2, zone 1 and zone 2 on the inner circumferential side are the non-data area, and zones 3 to zone Z are the user data area.

The user data area is an area for user data recording of which is requested by host 217.

The non-data area includes an area for adjusting recording for appropriately adjusting laser output of optical head 201 by laser driving circuit 207, and an area for adjusting servo for scanning by appropriately collecting light beams radiated from optical head 201 on optical disc 200 at a groove track or a land track provided on optical disc 200, and a data management area for managing status of use for the user data area and a defect portion such as a flaw on optical disc 200.

The track is formed by wobbling at a wavelength of a spatial period in proportion to the radial position on optical disc 200. The central angle of optical disc 200 corresponding to the spatial period of wobbling of the track is constant regardless of the radial position. In other words, the spatial period of wobbling is longer toward the outer circumference in proportion to the radial position. In this manner, wobbling of the track is radially configured.

If data is recorded on the entire surface of optical disc 200 in synchronization with the spatial period of wobbling, toward the outer circumference, the line density of a recording pattern is lower and the recording capacity decreases. Accordingly, optical disc device 20 of the present exemplary embodiment changes the ratio of data unit length to the spatial period of wobbling according to the radius, that is, optical disc device 20 changes, on the optical disc, the length of one bit of a recording pattern to be recorded, to thereby achieve an approximately constant line density over the entire surface.

ADIP information including address information of the track on optical disc 200 is modulated and embedded in the wobbling of the track. One cycle of the track on optical disc 200 is equally divided into seven tracks at a constant angle regardless of the radial position. One piece of ADIP information is embedded in each track obtained by dividing. The central angle of optical disc 200 corresponding to the spatial period of wobbling of the track is constant regardless of the radial position, and thus the number of wobbles included in each of the seven tracks which have been divided, that is, the included number of wobbles of one wavelength, is constant regardless of the radial position. That is, the number of wobbles of one wavelength corresponding one piece of ADIP information is constant regardless of the radial position.

Optical disc device 20 in FIG. 1 will be described again. Spindle motor 202 rotates optical disc 200. Optical head 201 records data on optical disc 200 by radiating light beams on optical disc 200, and also reproduces data on optical disc 200.

Servo controller 203 controls optical head 201 and spindle motor 202, and performs control of scanning by collecting light beams radiated from optical head 201 on optical disc 200 at the track provided on optical disc 200, and also performs movement control for accessing a target track. Servo controller 203 controls the position of optical head 201 and the rotation speed of spindle motor 202 such that optical head 201 scans optical disc 200 at a constant linear velocity.

I/F circuit 216 receives, from a host, recording data to be recorded on optical disc 200, and also sends, to host 217, reproducing data reproduced from optical disc 200.

Error correction coding circuit 209 adds, to the recording data received from I/F circuit 216, a parity for error correction.

Wobble detection circuit 210 extracts, from a reproducing signal from optical disc 200, a wobble signal based on a temporal period of wobbling of the track. Optical disc 200 rotates facing optical head 201. Accordingly, the position in the radial direction of the track facing optical head 201 periodically changes according to a spatial period of wobbling of the track and the linear velocity of optical disc 200 at the track. Wobble detection circuit 210 detects this periodical change as a waveform, and outputs the same as a wobble signal. In the case where optical disc 200 is rotated at a constant linear velocity, the frequency of the wobble signal is higher toward a track on the inner circumference.

Wobble PLL circuit 211 generates a pulse signal corresponding to the frequency of the wobble signal, and generates a wobble clock by multiplying the frequency of the pulse signal by a predetermined factor. The frequency of the wobble clock, that is, the number of pulses per unit time, is in proportion to the spatial period of the wobbling of the track. Also, the number of pulses of the wobble clock corresponding to one piece of ADIP information is constant regardless of the radial position.

ADIP reproducing circuit 213 reproduces the ADIP information from the wobble signal and the wobble clock.

Channel PLL circuit 212 generates a recording clock that is in synchronization with a phase of the wobble clock and whose frequency is n/m times (m and n are natural numbers) the frequency of the wobble clock. The value of n/m is the ratio of the number of bits in a bit pattern of recording data to the spatial period (one wavelength) of wobbling, and is set for each zone of optical disc 200. The m and n are pre-set values included in a zone table. The m, n and n/m are examples of information about the line density of data for each zone. The values of m and n are supplied by system controller 215.

Now, description will be given on the zone table. The zone table is a table holding information about each zone for an optical disc recording or reproducing of which can be performed by optical disc device 20. For example, a zone table for optical disc 200 sets, for each of zone 1 to zone Z, values of the zone number, m, n, ADIP reference position Pwo, and starting data block reference position Pm. ADIP reference position Pwo and starting data block reference position Pm will be described later.

The zone table for optical disc 200 is associated with the zone format identification number corresponding to optical disc 200. Such a zone table is stored in ROM 219 for each format identification number of an optical disc recording or reproducing of which may be performed by optical disc device 20.

Figure 3A:
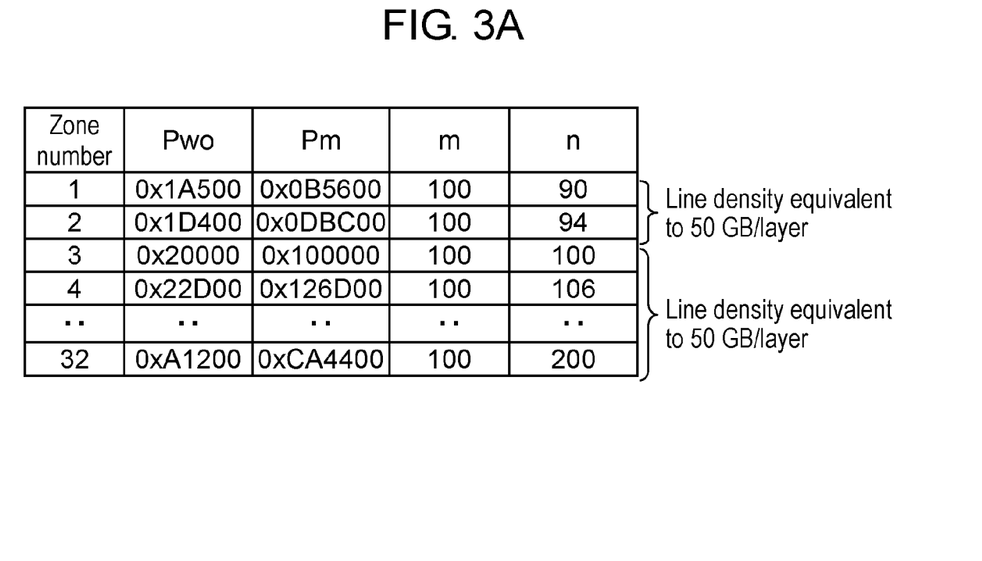
FIG. 3A is a diagram showing a zone table according to the exemplary embodiment.
Figure 3B:
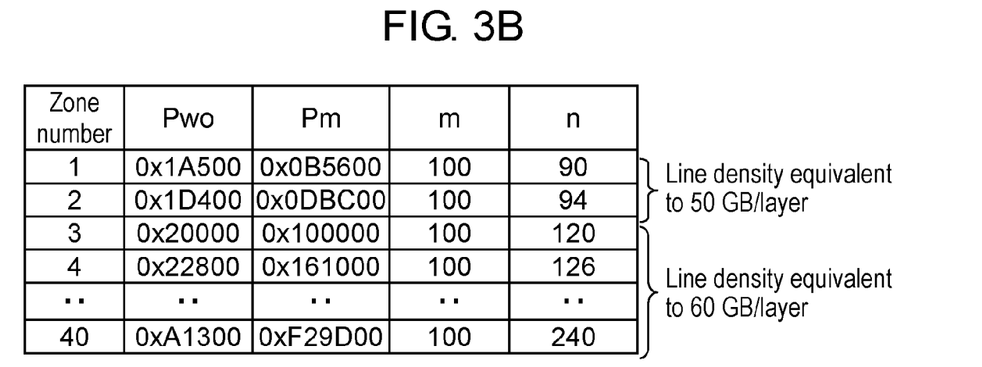
FIG. 3B is a diagram showing another zone table according to the exemplary embodiment.

FIGS. 3A and 3B are diagrams showing zone tables according to the present exemplary embodiment. FIG. 3A shows an example of a zone table of a case where the zone format identification number is "1", and FIG. 3B shows an example of a zone table of a case where the zone format identification number is "2". In FIGS. 3A and 3B, values of m, n, ADIP reference position Pwo, and starting data block reference position Pm are set for each zone. In FIG. 3A, zone numbers 1 to 32 are set, and in FIG. 3B, zone numbers 1 to 40 are set.

Optical disc device 20 in FIG. 1 will be described again. Timing interpolation circuit 214 specifies the position of recording or reproducing recording data, based on the ADIP information and the values of n and m supplied by system controller 215.

Data modulation circuit 208 converts recording data into a recording pattern to be recorded on optical disc 200, by modulating recording data including a parity from error correction coding circuit 209 in synchronization with a recording clock generated by channel PLL circuit 212 and by a predetermined modulation rule according to a position specified by timing interpolation circuit 214.

Laser driving circuit 207 converts the recording pattern into light pulses to accurately form marks on optical disc 200, and drives laser of optical head 201.

As described above, a recording pattern generated by data modulation circuit 208 is recorded on optical disc 200 based on a recording clock. The frequency of the recording clock is n/m times the frequency of the wobble clock. Accordingly, the length of one bit of the recording pattern is determined based on the ratio of n/m with respect to the spatial period of wobbling of the track. That is, if the value of n is larger or the value of m is smaller, the length of one bit of the recording pattern to be recorded on optical disc 200 is shorter, and the line density can be increased. Moreover, the spatial period of the wobble clock is longer toward the outer circumferential side in accordance with the radial position on optical disc 200, and thus by setting m and n so that n/m correspondingly is higher, the line density of the recording pattern on optical disc 200 can be made constant.

Optical disc device 20 of the present exemplary embodiment sets the values of m and n for each zone of optical disc 200. By setting m and n for each zone in such a way that n/m is larger for a zone toward the outer circumferential side with a larger zone number, the line density of the recording pattern on optical disc 200 can be made approximately constant. That is, it is possible to cause a range of line density of the recording pattern to fall within a constant range.

Reproduction PLL circuit 204 extracts, from a reproducing signal from optical disc 200, a synchronization clock for demodulating the reproducing signal.

Data demodulation circuit 205 demodulates recorded data from the reproducing signal according to a position specified by timing interpolation circuit 214. Specifically, data demodulation circuit 205 selects the closest expected waveform based on comparison of signal amplitudes between the reproducing signal and expected waveforms, and selects original data of the expected waveform as the demodulation result.

Error correction decoding circuit 206 corrects the error of the demodulated data and restores the data.

ROM 219 is configured by a flash memory. ROM 219 stores programs to be used by system controller 215 to control the entire optical disc device 20. Also, ROM 219 stores a plurality of zone tables.

BCA reproducing circuit 218 reproduces recorded disc management information from the reproducing signal obtained by reproducing the BCA.

System controller 215 controls each block and also controls communication with host 217 by reading and executing the programs stored in ROM 219. System controller 215 reads the values of m and n corresponding to the zone including a target position for recording or reproducing from the zone table, and notifies channel PLL circuit 212 and timing interpolation circuit 214 of the values. System controller 215 controls each configuration of optical disc device 20 in such a way that data is recorded based on the recording clock generated by channel PLL circuit 212 and the recording position specified by timing interpolation circuit 214. Data modulation circuit 208, laser driving circuit 207, and optical head 201 record data based on the recording clock and the recording position.

(1-2. Operation)

Next, an operation of optical disc device 20 according to the present exemplary embodiment will be described. First, an operation that is performed at the time of mounting of optical disc 200 on optical disc device 20 according to the present exemplary embodiment will be described. When optical disc 200 is mounted on optical disc device 20, BCA reproducing circuit 218 reproduces the BCA recorded on optical disc 200, and acquires the disc management information.

System controller 215 receives the disc management information from BCA reproducing circuit 218, and extracts the zone format identification number in the disc management information. System controller 215 specifies the zone table corresponding to the zone format identification number among the zone tables stored in ROM 219, and reads the specified zone table.

Next, the operation of recording on optical disc 200 by optical disc device 20 according to the present exemplary embodiment will be described.

I/F circuit 216 acquires recording data transmitted from host 217 and the logical address of a recording destination. The recording data is divided into predetermined units of blocks, and is sent to error correction coding circuit 209 on a per block basis.

Error correction coding circuit 209 adds, to recording data in block units, a parity code for correcting an error at the time of reproducing.

Data modulation circuit 208 modulates recording data to which a parity code is added into a recording pattern according to a 1-7 Parity Preserve (PP) code modulation rule, for example.

Laser driving circuit 207 converts the recording pattern modulated by the 1-7PP code from 2T to 9T recording marks and spaces into a castle shaped pulse waveform in order to accurately form recording marks on optical disc 200, and outputs to optical head 201 a drive signal for driving the laser.

Optical head 201 records the recording pattern by radiating a laser pulse on a position on optical disc 200 corresponding to the logical address of the recording destination.

Optical disc 200 is configured by ADIPs provided radially. Accordingly, channel PLL circuit 212 controls the recording clock so that the line density of a recording pattern within the recording surface of optical disc 200 is approximately constant. Wobble detection circuit 210 detects a wobble signal according to the wobbling of the track. Wobble PLL circuit 211 generates a wobble clock that is in synchronization with the wobble signal. Channel PLL circuit 212 operates in such a way that the phase of a clock obtained by dividing the wobble clock by m and the phase of a clock obtained by dividing the recording clock by n are synchronized with each other, and thus generates a recording clock of a frequency n/m times the wobble clock.

System controller 215 controls the recording operation described above. System controller 215 first specifies, based on the logical address of the recording destination acquired by I/F circuit 216, the data address where the recording data is to be recorded, and the zone and the track (groove track or land track) including the data address. The data address here is a physical address on optical disc 200 determined based on the ADIP, the physical address being for designating the recording or reproducing position of recording data. System controller 215 refers to the zone table, and acquires m, n, ADIP reference position Pwo, and starting data block reference position Pm of the zone number corresponding to the specified zone.

Figure 4:
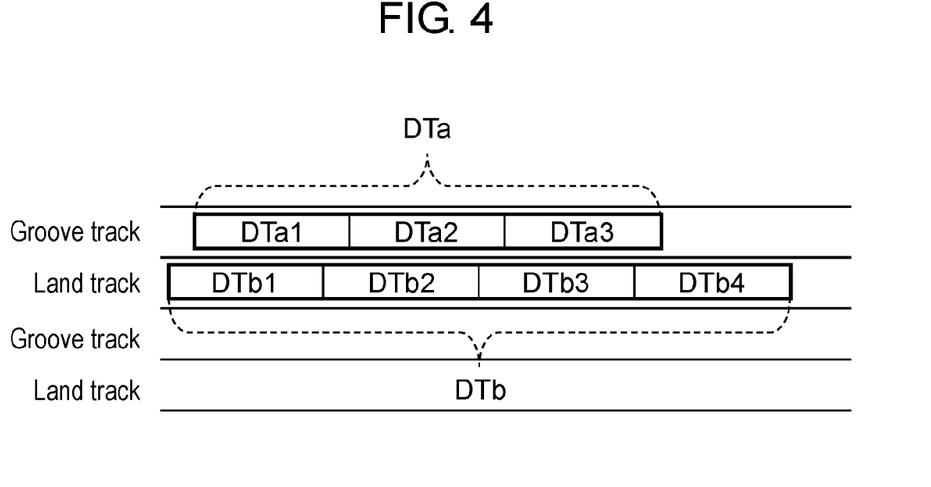
FIG. 4 is a diagram showing a case where a plurality of blocks is recorded on the optical disc according to the exemplary embodiment.

The recording data is divided into units of blocks, and a plurality of blocks regarding one piece of recording data are continuously recorded on either the groove track or the land track on the same layer. FIG. 4 is a diagram showing a case where a plurality of blocks is recorded on optical disc 200 according to the present exemplary embodiment. FIG. 4 schematically shows the tracks that are continuously arranged in the radial direction of optical disc 200. In FIG. 4, data DTa is divided into three pieces, and DTa1, DTa2, and DTa3 are continuously recorded on a groove track. Furthermore, in FIG. 4, data DTb is divided into four pieces, and DTb1, DTb2, DTb3, and DTb4 are continuously recorded on a land track.

When one piece of recording data is collectively recorded on the same track on the same layer in the above manner and the recording data recorded on optical disc 200 is reproduced, since movement of the position of optical head 201 is small, the recording data can be read in a short time.

Figure 5:
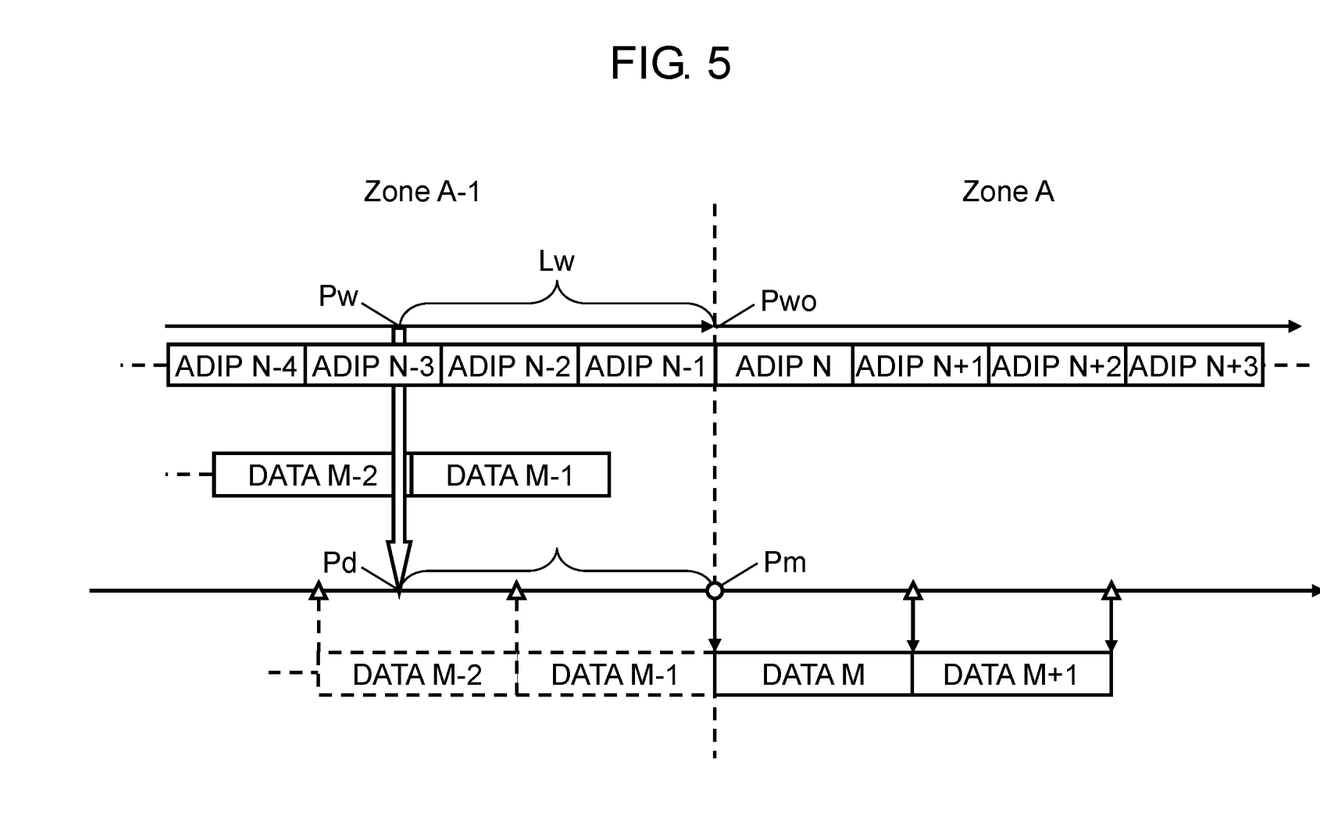
FIG. 5 is a diagram showing arrangement structures of data and addresses on the optical disc according to the exemplary embodiment.

FIG. 5 is a diagram showing arrangement structures of addresses and data on optical disc 200 according to the exemplary embodiment. FIG. 5 schematically shows an example of the arrangement structures of ADIP information and data blocks around the boundary between zone A-1 and zone A of a track on optical disc 200.

At the top of FIG. 5, pieces of ADIP information modulated and arranged according to wobbling of the track are shown. Also, in the middle, two data blocks recorded on a track included in zone A-1 of optical disc 200 are shown. Moreover, at the bottom, two data blocks recorded on a track included in zone A adjacent to zone A-1 are shown. In zone A-1, the range of addresses (hereinafter referred to as ADIPs) indicated by the pieces of ADIP information arranged by wobbling is N−4, N−3, N−2, and N−1, and in zone A, the range of ADIPs is N, N+1, N+2, and N+3.

In FIG. 5, in zone A-1, a recording pattern is recorded in two data blocks with continuous data addresses M−2 and M−1 (shown by solid lines). In zone A, a recording pattern is recorded in two data blocks with continuous data addresses M and M+1 (shown by solid lines). At the start position of zone A, the boundaries of the position indicated by ADIP N and the position indicated by data address M coincide with each other. Additionally, in the following, a data block at data address M may alternatively be referred to as data block M.

The recording start position of each zone is to coincide with the boundary position of the ADIP. Different n/m values are set for zone A-1 and zone A. The length of the zone is not necessarily an integral multiple of the length of the data block. Accordingly, as shown in FIG. 5, there may remain, between the end of the last data block M−1 in zone A-1 and the beginning of zone A, an area where data is not recorded.

A case where, in zone A, recording is performed in data block M+2 following data block M+1 will be described. Optical head 201 moves the position where laser is to be radiated to a position on the near side of a recording target position. Wobble detection circuit 210, wobble PLL circuit 211, and ADIP reproducing circuit 213 reproduce the ADIP information, and system controller 215 thereby specifies the physical position, on optical disc 200, facing optical head 201. Timing interpolation circuit 214 defines the beginning of zone A as ADIP reference position Pwo, and calculates distance Lw to current position Pw. Distance Lw is determined as Lw=Pw−Pwo.

Here, reference position Pwo and current position Pw on optical disc 200 can be specified based on wobble clock. For example, when counted with wobble clock from the innermost circumference of the track on optical disc 200, it is possible to express reference position Pwo and current position Pw by the number of pulses of wobble clock. The position corresponding to the beginning of the ADIP information is also included in the ADIP information as the number of pulses of wobble clock. Accordingly, by reading the ADIP information, it is possible to grasp the current position on optical disc 200. Moreover, distance Lw is also determined as the number of pulses of wobble clock.

Moreover, distance Ld, which is calculated distance Lw converted based on the length of a block of recording data, is calculated. Distance Ld based on units of blocks of recording data is determined as Ld=Lw×n/m. As can be seen from this equation, distance Ld is determined as the number of pulses (or a number corresponding to the same) of the recording clock. The number of the data block at the beginning of zone A is M, and current position Pd based on units of data blocks, with starting data block reference position Pm of zone A as the reference point, is determined as Pd=Pm+Ld. Distance Ld, reference position Pm, and current position Pd can be specified with a wobble clock as the reference.

Now, starting data block reference position Pm of zone A is stored in the zone table for zone A. Current position Pd is determined based on the zone including the starting data block reference position. That is, even if the current position is included in zone A-1, if the target position for recording or reproducing is included in zone A, the current position can be virtually determined with zone A as the reference.

For example, the positions, based on units of data blocks, of data blocks M-2 and M-1 recorded in zone A-1 can be calculated, with reference position Pm of zone A as the reference point. Data blocks M-2 and M-1 outlined by broken lines at the bottom of FIG. 5 indicate the virtual positions where reference position Pm of zone A is taken as the reference point. Even if the target position to be accessed is in zone A, the current position is in the area of zone A-1, and the boundary between the zones is crossed, since virtual current position Pd is used, data addresses are not interrupted. However, the virtual positions of data blocks M-2 and M-1 determined in this manner are different from the actual positions of data blocks M-2 and M-1 shown in the middle.

As described above, even if the current position is in the area of zone A-1, current position Pd, based on units of data blocks, with the beginning of zone A as the reference position, can be obtained by using the ADIP information.

Channel PLL circuit 212 operates, using the value of n/m determined in zone A, in such a way that the phase of a clock obtained by dividing the wobble clock by m and the phase of a clock obtained by dividing the recording clock by n are synchronized with each other, and thus generates a recording clock of a frequency n/m times the wobble clock.

Timing interpolation circuit 214 can cause a data timing interpolation counter to operate by the generated recording clock, based on specified current position Pd based on units of data blocks, and can interpolate the boundary of a following data block with the accuracy of one channel bit. When the target position for recording data is indicated by the data timing interpolation counter, data modulation circuit 208 and laser driving circuit 207 operate and start recording of the data.

Figure 6:
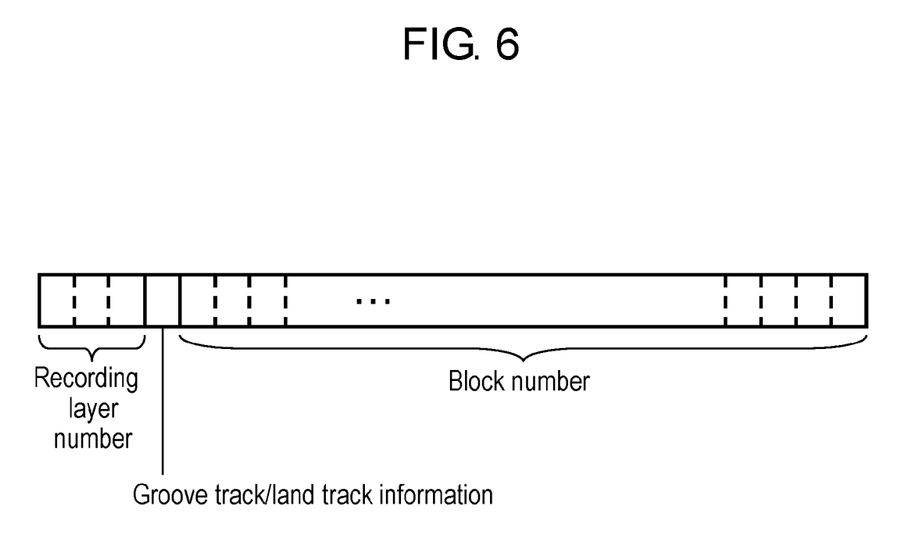
FIG. 6 is a diagram showing a configuration of a data address according to the exemplary embodiment.

A data address is added to recording data on a per data block basis. FIG. 6 is a diagram showing a configuration of a data address according to the exemplary embodiment. A data address is configured by a recording layer number, a block number, and groove track or land track information. The recording layer number is information indicating the number of a recording layer where data is recorded, the block number is information indicating a block number of data, and the groove track or land track information is information indicating whether the location where data is recorded is a land track or a groove track.

In the case of recording data block M+2, the number of the data block is M+2. Recording data to which a data address is added is modulated by data modulation circuit 208, and is recorded on a track of optical disc 200 by laser driving circuit 207 and optical head 201.

Next, a reproducing operation of optical disc device 20 according to the present exemplary embodiment will be described.

An operation of specifying a reproducing position on optical disc 200 is the same as the operation of specifying of a recording position in the recording operation. When the position of a data block to be reproduced is reached by the data timing interpolation counter operated by timing interpolation circuit 214, reproduction PLL circuit 204, data demodulation circuit 205, and error correction decoding circuit 206 operate and reproduce data.

Position of recording or reproducing data is determined by channel PLL circuit 212 and timing interpolation circuit 214. This operation is determined by the value of the ratio n/m between the frequencies of wobble clock and recording clock, and the values of starting ADIP reference position Pwo of each zone and starting data block reference position Pm of each zone, and recording or reproducing has to be performed after uniquely determining these values. If these values are even slightly different, reproducing data cannot be performed. A zone table where the values described above are listed for each zone as management information of optical disc 200 is configured.

System controller 215 refers to the zone table according to the zone format identification number read from the BCA and specifies each value, and performs recording or reproducing data as described above.

With optical disc 200 according to the present exemplary embodiment, recording data is performed at an arbitrary line density on a per zone basis, and the format of the track on optical disc 200 is common regardless of the line density of data to be recorded. However, for example, a material of a recording film of optical disc 200 is improved and altered from the standpoint of allowing stable recording at a high line density, of further increasing the long-term stability, and of reducing the manufacturing cost. This alteration changes the line density at which recording can be appropriately performed on the optical disc. Accordingly, to enable selection of an appropriate line density for a disc with the same format for the track, the zone format identification number is recorded in the BCA unrelated to the track.

Since data can be recorded on optical disc 200 according to the present exemplary embodiment at an arbitrary line density, for example, the line density can be determined to be of a recording capacity of 50 GB per layer for a case of zone format identification number "1", 60 GB per layer for a case of zone format identification number "2", and 80 GB per layer for a case of zone format identification number "3". Recording or reproducing data can be performed by using a zone table determined for each zone format identification number.

If the line density is greatly different as described above, the frequency characteristics of a reproducing signal are accordingly changed, and thus the signal processing method of reproduction PLL circuit 204 and data demodulation circuit 205 at the time of reproducing data has to be greatly changed. If optical disc device 20 possesses reproduction PLL circuit 204 and data demodulation circuit 205 that are adaptable with line densities ranging from 50 GB to 80 GB per layer, optical disc device 20 can read the zone format identification number recorded in the BCA, refer to the zone table according to the zone format identification number, and reliably reproduce the data.

Also, in the case where optical disc device 20 does not possess reproduction PLL circuit 204 and data demodulation circuit 205 that are adaptable with the line density of 80 GB per layer, data cannot be reproduced even if the zone format identification number recorded in the BCA is read and the zone table is accordingly referred to. To prevent such an error of reproducing data, predetermined scrambling may be performed so that optical disc device 20 not adaptable with the line density of 80 GB per layer cannot normally reproduce data in the BCA.

In the case where optical disc device 20 cannot normally reproduce data in the BCA, it is not possible to read the zone format identification number and to refer to the zone table. Accordingly, optical disc device 20 determines that the optical disc is not adaptable, before performing erroneous recording or reproducing with respect to optical disc 200. Optical disc 200 can therefore be protected.

Moreover, if the line density of a recording pattern on optical disc 200 is increased, the Signal-to-Noise ratio (S/N ratio) of the reproducing signal is reduced. Thus, demodulation error is likely to occur at data demodulation circuit 205 with respect to a change in the amplitude of the reproducing signal. To suppress the demodulation error, adaptive signal processing of changing the amplitude of the expected waveform at data demodulation circuit 205 according to the amplitude of the reproducing signal is necessary.

In the user data area, user data is continuously recorded, and thus the adaptive signal processing may be performed without interruption and reproducing can be stably performed. On the other hand, in the non-data area, recording is often performed little by little in small units, and the recording state is not continuous, and thus an error may remain even with the adaptive signal processing, and the margin in the reproducing performance tends to be reduced.

Information recorded in the non-data area, particularly, in the data management area for managing a defect portion, is important. If information in the data management area cannot be acquired, the position on optical disc 200 where the user data is recorded is unknown, and the user data cannot be reproduced.

Accordingly, to secure the margin in the reproducing performance so as to allow information in the data management area to be reliably acquired, optical disc device 20 according to the present exemplary embodiment sets the values of m and n in the zone table in such a way that the line density in a zone corresponding to the non-data area is lower than the line density in a zone corresponding to the user data area.

Here, that "the line density in a zone corresponding to the non-data area is lower than the line density in a zone corresponding to the user data area" means that "the maximum value of the line density in a zone corresponding to the non-data area is smaller than the minimum value of the line density in a zone corresponding to the user data area".

If the line density is the same, the ratio n/m between the frequencies of wobble clock and recording clock is increased in proportion to the radial position. The values of n/m for zone 1 and zone 2 included in the non-data area are increased in proportion to the radial position at the same line density, and the values of n/m for zone 3 and later zones included in the user data area are increased in proportion to the radial position at a line density higher than the line density in the non-data area.

Furthermore, in the non-data area, recording adjustment for appropriately adjusting the laser output of optical head 201 by laser driving circuit 207 is performed so that recording may be desirably performed on optical disc 200. In the recording adjustment, the control timing for increasing or reducing the laser output and the laser output level are adjusted so that the beginning and the end of a mark to be recorded on the track come at appropriate positions. Whether the beginning and the end of a mark are at appropriate positions is evaluated using a reproducing signal. The control timing and the laser output level can be adjusted based on whether the transition timing of a reproducing signal is more advanced or delayed compared to the expected waveform at the beginning or the end of a mark. However, when the line density is increased, gradient of transition in amplitude of the reproducing signal at the beginning or the end of a mark is gradual. Also, a change in amplitude caused by influence of a recording pattern of preceding and following marks and spaces is great, and it is difficult to accurately evaluate the transition timing. Accordingly, recording adjustment may be performed at a low line density so as to accurately evaluate the transition timing.

In the zone table shown in FIG. 3A, the line density is of a recording capacity of 50 GB per layer for all the zones, and in the zone table shown in FIG. 3B, the line density is of a recording capacity of 50 GB per layer for zones 1 and 2, which are non-data areas, and a recording capacity of 60 GB per layer for zones 3 to 40, which are user data areas. In this manner, in the zone table shown in FIG. 3B, the line density of a zone corresponding to the non-data area is lower than the line density of a zone corresponding to the user data area.

As described above, optical disc 200 changes the zone format identification number according to the line density of the user data area, the line density of the non-data area, and the number of divided zones. Optical disc device 20 can generate a zone table according to the zone format identification number of optical disc 200, and perform appropriate recording or reproducing data on optical disc 200.

What is claimed is:

1. An optical disc that a track, where data is recorded in predetermined block units, is formed by wobbling at a spatial period in accordance with a radial position, and the track is divided into a plurality of zones in a radial direction, and that data is recorded in each of the plurality of zones at a predetermined line density based on a ratio n/m (m and n are natural numbers) of a number of bits of a bit pattern of recording data to one wavelength of the wobbling,
the optical disc comprising:
a first area having at least one of the plurality of zones;
a second area having at least one of the plurality of zones different from the at least one of the plurality of zones in the first area, and a line density of data different from a line density of data in the first area; and
a Burst Cutting Area (BCA), where a zone format identifier specifying, for each of the plurality of zones, a zone table defining a boundary position of each of the plurality of zones and the ratio n/m of the number of bits, is recorded.

2. The optical disc according to claim 1, wherein
the first area is a user data area for recording user data,
the second area is a non-data area for recording other than the user data,
the line density of data in the at least one of the plurality of zones forming the user data area is in a first range,
the line density of data in the at least one of the plurality of zones forming the non-data area is in a second range, and
the second range is lower than the first range.

3. An optical disc recording or reproducing method for recording or reproducing data on an optical disc, the optical disc that a track, where data is recorded in predetermined block units, is formed by wobbling at a spatial period in accordance with a radial position, and the track is divided into a plurality of zones in a radial direction, and that data is recorded, on the optical disc in each of the plurality of zones at a predetermined line density based on a ratio n/m (m and n are natural numbers) of a number of bits of a bit pattern of recording data to one wavelength of the wobbling, and
the optical disc includes
a first area having at least one of the plurality of zones,
a second area having at least one of the plurality of zones different from the at least one of the plurality of zones in the first area, and a line density of fata different from a line density of data in the first area, and
a Burst Cutting Area (BCA), where a zone format identifier specifying, for each of the plurality of zones, a zone table defining a boundary position of each of the plurality of zones and the ratio n/m of the number of bits is recorded, the optical disc recording or reproducing method comprising:

acquiring the zone format identifier in the BCA on the optical disc;

determining a recording or reproducing position in the at least one of the plurality of zones including a target position of data, based on the zone table corresponding to the zone format identifier; and recording or reproducing data from the recording or reproducing position.

4. The optical disc recording or reproducing method according to claim 3, wherein the first area is a user data area for recording user data, the second area is a non-data area for recording other than the user data, the line density of data in the at least one of the plurality of zones forming the user data area is in a first range, the line density of data in the at least one of the plurality of zones forming the non-data area is in a second range, and the second range is lower than the first range.

* * * * *